June 27, 1944.  R. J. McFALL  2,352,215
CONTROL MEANS FOR AUTOMATIC STOKERS
Filed Sept. 1, 1937  5 Sheets-Sheet 1

Inventor
Robert J. McFall,
By Stone, Boyden & Mack,
Attorneys

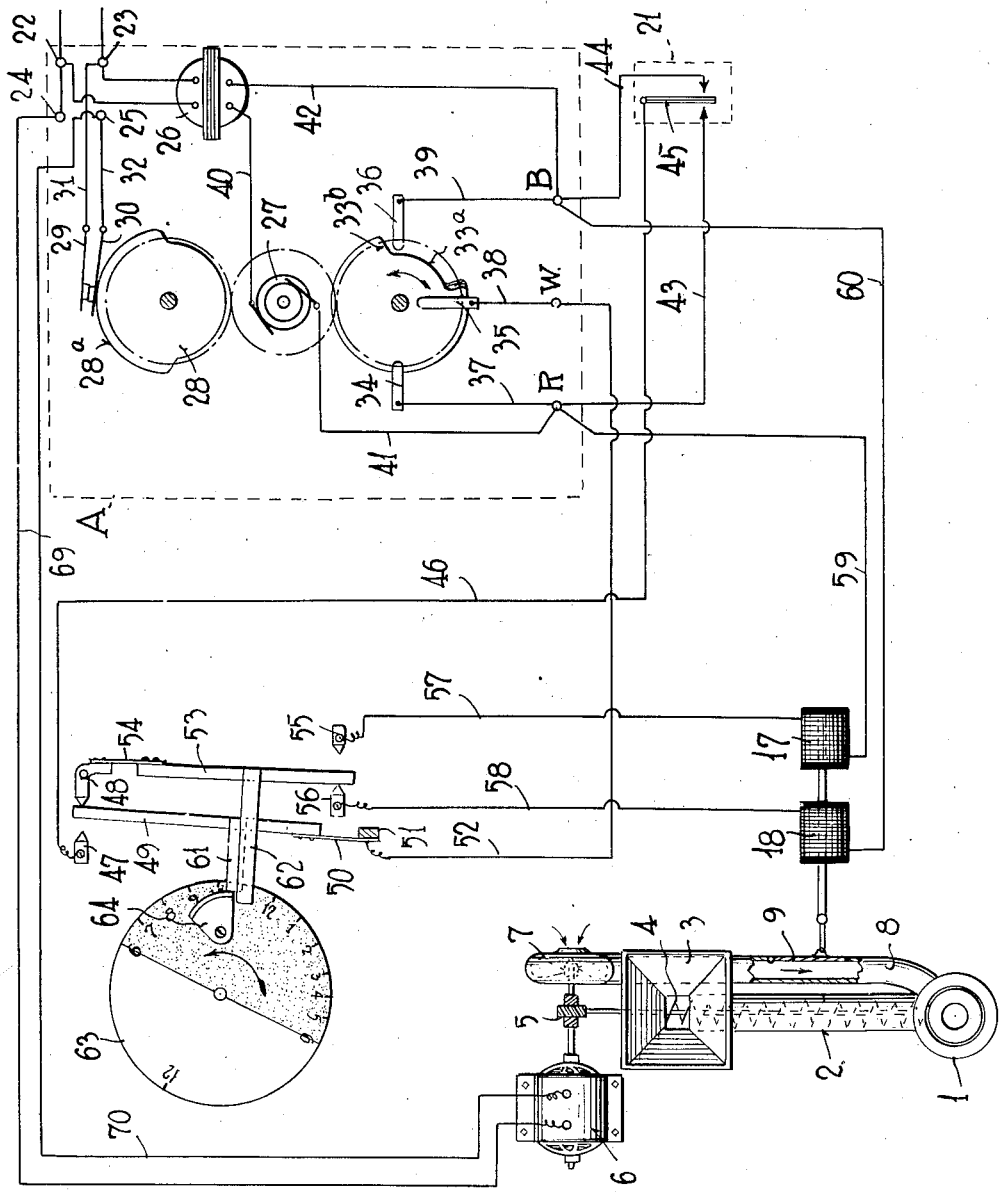

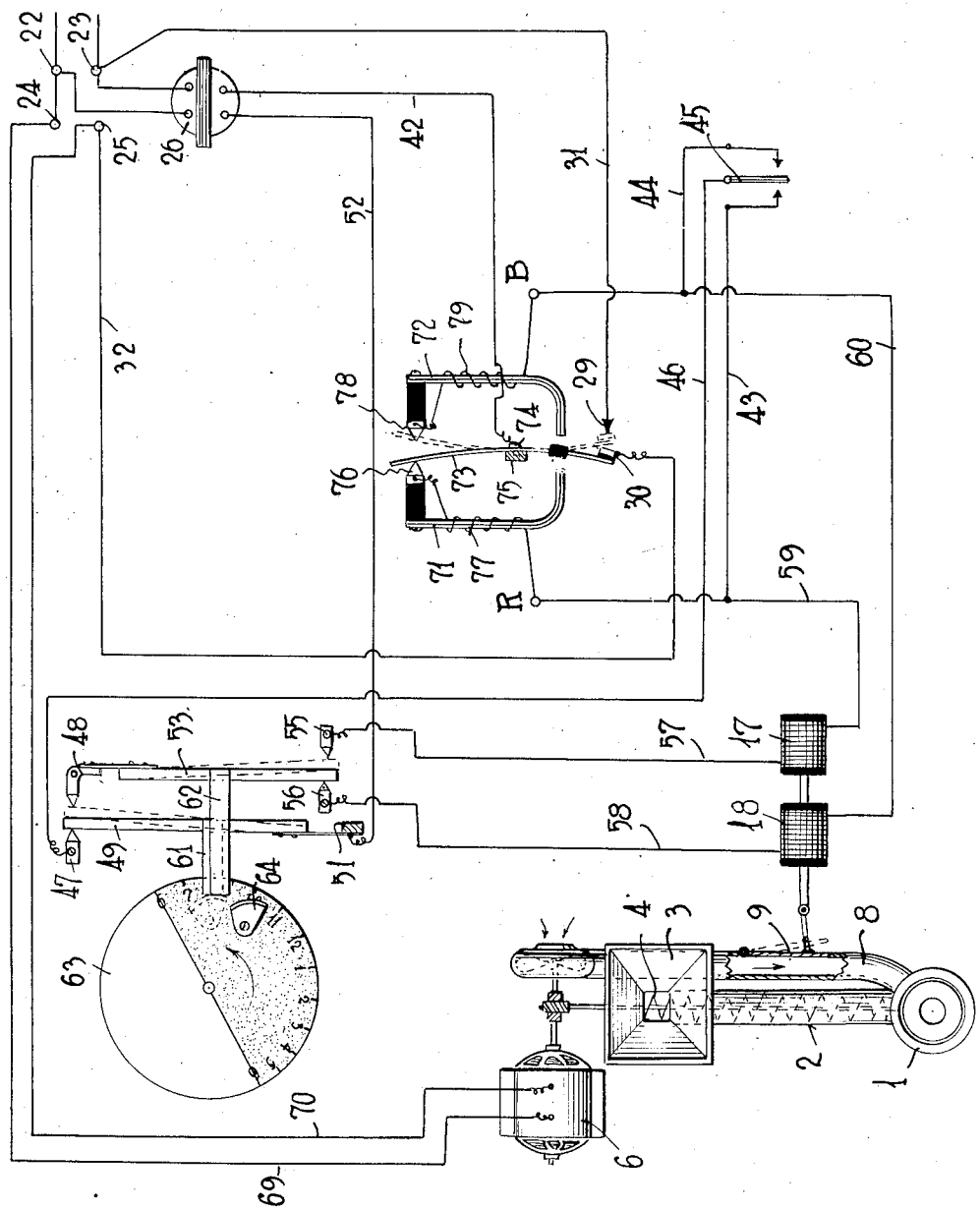

June 27, 1944.  R. J. McFALL  2,352,215
CONTROL MEANS FOR AUTOMATIC STOKERS
Filed Sept. 1, 1937  5 Sheets-Sheet 4
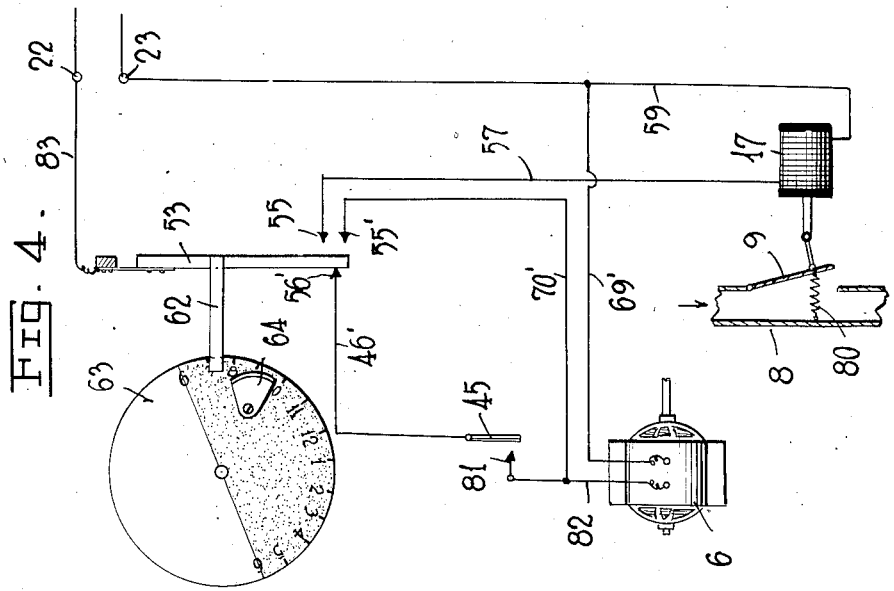
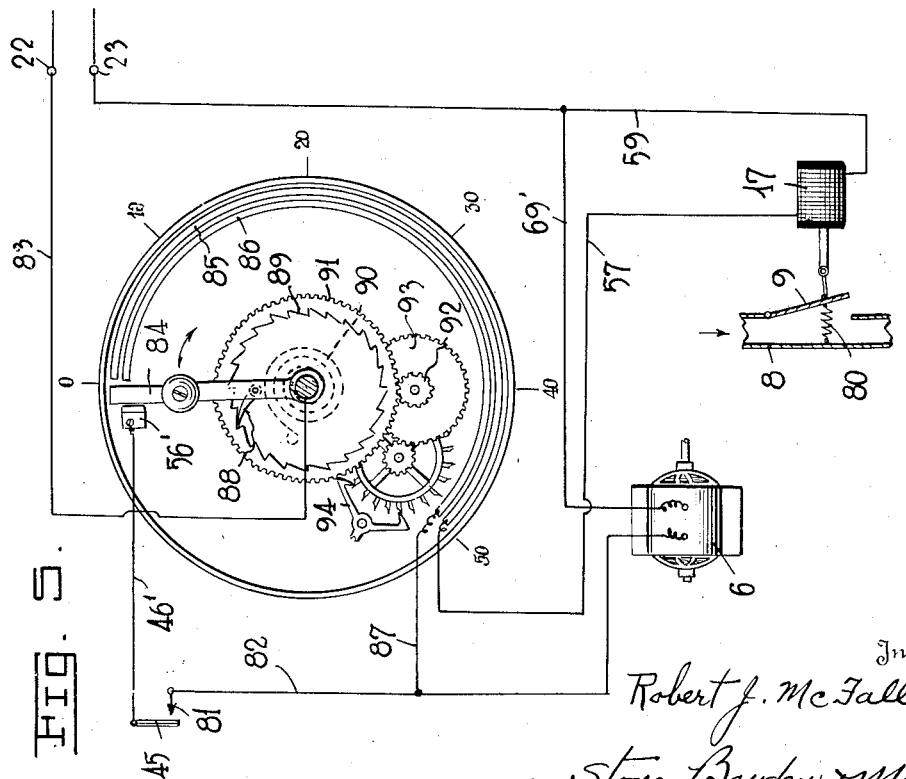
Inventor
Robert J. McFall,
By Stone, Boyden & Mack,
Attorneys June 27, 1944.  R. J. McFALL  2,352,215
CONTROL MEANS FOR AUTOMATIC STOKERS
Filed Sept. 1, 1937  5 Sheets-Sheet 5
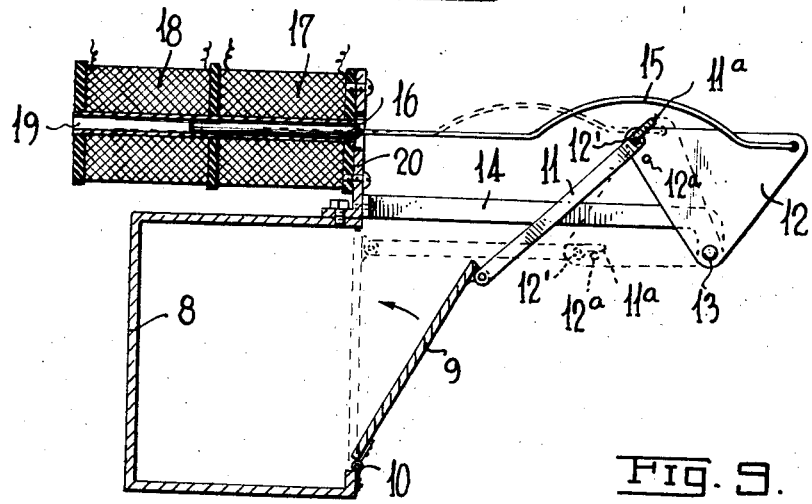
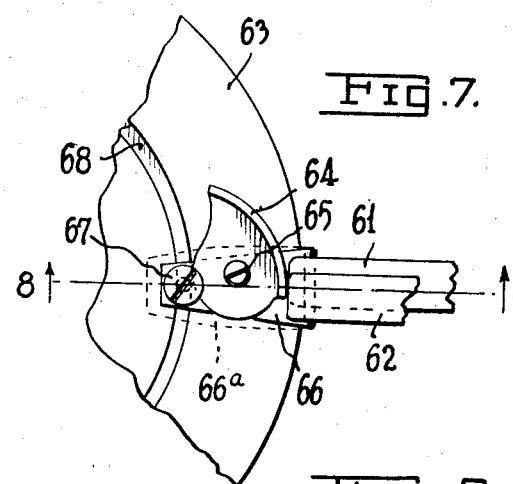
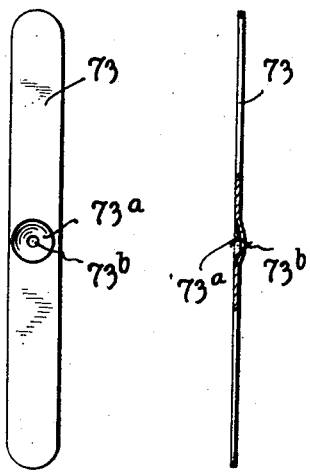
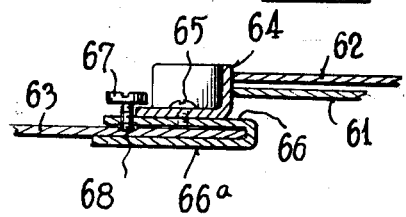
Inventor
Robert J. McFall,
By Stone, Boyden & Mack,
Attorneys Patented June 27, 1944

2,352,215

UNITED STATES PATENT OFFICE 2,352,215

CONTROL MEANS FOR AUTOMATIC STOKERS

Robert J. McFall, Arlington, Va., assignor to J. Austin Stone, J. Hanson Boyden, and Carl T. Mack, all of Washington, D. C., jointly Application September 1, 1937, Serial No. 162,056

12 Claims. (Cl. 236—46)

This invention relates to means for controlling mechanical coal stokers, and more particularly automatic stokers of the type commonly employed for maintaining an even temperature in buildings, or an even temperature of water or constant pressure of steam in boilers.

As is well known, such stokers are usually controlled by a thermostat located in some typical position within the building to be heated, or by an aquastat or pressurestat. For simplicity, I will hereinafter designate all of such devices as "thermostats." It is common practice in many cases to provide two thermostats, that is to say, the so-called "day" and "night" thermostats, and to place these under the control of a time clock so that at a definite hour each day the system is transferred from one thermostat to the other. The two thermostats are set to maintain different temperatures and thus by shifting the control from one to the other, the desired temperatures may be maintained throughout different periods during the day.

It has been found in practice, however, that at the time when the control is shifted from the so-called "night" thermostat to the "day" thermostat, so as to provide a higher temperature, the fire is relatively low, and it takes considerable time to build up the necessary heat and to raise the temperature of the building to the desired point.

In the older heating installations, where hand firing has been employed, it has been the common practice to "bank" the fire for the night, that is to say, the furnace is filled with fresh coal and the drafts turned off, so that the fire remains dormant and smolders through the night. Then in the morning, when more heat is required, and the drafts are turned on, there is present a large body of quickly available fuel which burns rapidly and produces the desired heat in a relatively short time.

The general object of the present invention is to apply this well known banking idea to heating furnaces operated by modern automatic stokers.

These mechanical or automatic stokers as commonly constructed comprise a screw conveyor for forcing coal into the fire box, and also a fan or blower for supplying air under pressure to the fire, both the conveyor and fan being driven by the same motor, usually electric. So long as both fuel and air are supplied to the fire box in the proper proportions, complete combustion of the fuel takes place and the desired temperature is maintained. As distinguished from this, however, the banking operation requires that a certain amount of fuel be fed into the furnace without any air being supplied to burn the same, so that a quantity of unburnt fuel will accumulate in the fire box.

In order to carry out this banking operation, therefore, where a mechanical stoker of the type referred to is employed, I contemplate operating the conveyor for delivering coal into the furnace, while rendering the fan or blower ineffective to supply air thereto.

To this end, and specifically, the invention contemplates the provision of a damper in connection with the air conduit, in combination with means for shifting the damper, when required, to such a position that it prevents the delivery of any substantial amounts of air to the fire box while the fuel delivery means is operating.

A further object of the invention is to provide time controlled means for automatically restoring the damper, or other means for regulating the air supply, to normal position.

A still further object of the invention is to devise means operated by a time clock or the like for rendering the air supplying means ineffective, at a predetermined definite hour, while at the same time putting the fuel feeding means into operation, the said time clock serving to stop the operation of the fuel feeding means and restore the air supplying means to normal condition at the end of a predetermined interval.

A still further object of the invention is, in systems employing a thermostat, to provide means whereby simultaneously with putting the fuel feeding means into operation and rendering the air supplying means ineffective, control of the system is shifted from the thermostat to a timing device, so that, at the end of a definite time interval, the fuel feeding means will be stopped and the air supplying means restored to normal, and thereupon the control of the system returned to the thermostat.

A subsidiary object is to provide apparatus of the above character capable of being applied as an attachment to existing systems comprising standard time clocks, theremostats and commercially available relays or the like.

Other objects and advantages of the invention will hereinafter more fully appear.

In order that the invention may be readily understood, reference is had to the accompanying drawings, forming part of this specification, and in which:

Fig. 2 is a similar view showing the parts in different operative position;

Fig. 3 is a view similar to Figs. 1 and 2, but showing a system embodying a special thermoelectric snap switch or relay instead of the commercially available relay;

Fig. 4 is a diagram illustrating how the principle of the invention may be carried out with a single pole thermostat instead of the double pole thermostats shown in Figs. 1 to 3;

Fig. 5 is a similar view showing the invention employed in connection with an ordinary time controlled device, instead of a standard time clock such as illustrated in the other views;

Fig. 6 is a detailed view on an enlarged scale showing one form of air damper and its operating means, which I may employ;

Fig. 7 is a detailed fragmentary view on an enlarged scale showing my improved switch actuating cam which I attach to the standard time clock;

Fig. 8 is a transverse section on the line 8—8 of Fig. 7, looking in the direction of the arrows; and Figs. 9 and 10 are a front elevation and sectional edge view respectively of the snap switch element employed in the thermo-electrical relay shown in Fig. 3.

Figure 1:
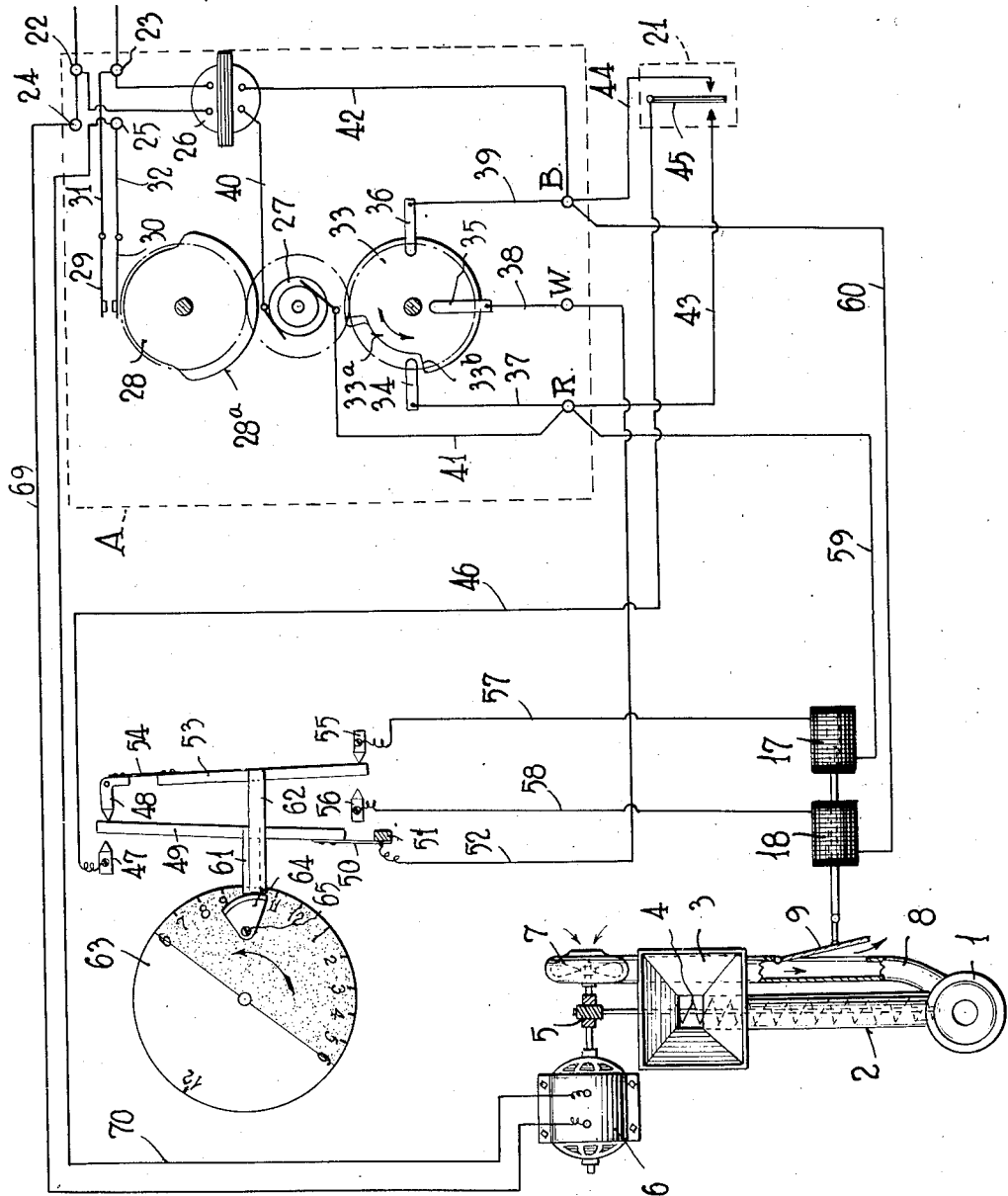
Fig. 1 is a diagrammatic view illustrating my invention as applied to a well known form of automatic stoker controlled by a thermostat, time clock, and commercially available relay.

Referring to the drawings in detail and first more particularly to Figs. 1 and 2 thereof, I designates the fire pot of a well known form of mechanical stoker comprising a fuel delivery conduit 2 in which operates a screw conveyor 4, to which fuel is fed from a hopper 3. This conveyor is driven by gearing 5 from an electric motor 6, on the shaft of which is mounted a fan or blower 7, adapted to deliver air to the fire through an air conduit 8.

For the purpose of carrying out the objects of my invention, as will hereinafter more fully appear, I cut away a portion at one side of the air conduit 8 and mount in the opening a pivoted damper 9.

For simplicity and clearness, this is shown in Figs. 1, 2 and 3 as swinging about a vertical axis, but in the preferred form, as illustrated in detail in Fig. 6, the damper 9 is mounted to swing about a horizontal axis 10. To the upper edge of the damper 9 is pivotally connected a link 11 which is pivoted at its other end at 12' to a triangular rocker 12, itself pivoted at its lower end at 13 to a fixed bracket 14. The third corner of the rocker 12 is connected by a link 15 with a core 16 adapted to cooperate with two solenoids 17 and 18. These are preferably wound on a common brass tube 19 and may be conveniently supported by means of a bracket 20 secured to the air conduit 8. The link 15 is preferably resilient in order to permit the necessary arcuate movement of the outer end, as the rocker 12 swings on its pivot.

In Fig. 6, the damper is shown as in its open position, and it will be understood that when in this position the air pressure within the conduit 8 is substantially relieved and most of the air blows out through the opening in the conduit and thus is not forced into the fire box. The parts are shown in full lines in the position which they occupy when the solenoid 17 has been energized to open the damper. When the solenoid 18 is energized, the core 16 is drawn to the left, the rocker 12 swung on its pivot, and the link 11 and damper 9 moved to dotted line position, in which position an extension 11ª on the link engages a stop pin 12ª, or the like, and the link thus serves to hold or lock the damper closed, due to the fact that the three pivots are substantially in line. Other forms of damper may, of course, be employed without departing from the spirit of the invention.

Referring again to Fig. 1, the usual double pole thermostat is indicated at 21, the bi-metallic element being designated 45.

The apparatus enclosed within the dotted rectangle designated by the reference character A corresponds to that comprised in a well known commercially available relay commonly employed in connection with the thermostatic control of automatic stokers.

A suitable source of current, such as 110 volts, is connected to the apparatus at binding posts 22 and 23, and the motor 6 is connected to the binding posts 24 and 25. The binding posts 22 and 24 are connected as shown.

26 designates the usual step-down transformer, the primary of which is connected across the line at the binding posts 22 and 23, and the secondary of which is arranged to deliver a relatively low voltage such as 18 or the like.

27 designates a small pilot motor, which operates through suitable gearing a cam 28 and a contact disk 33. In practice, these are on the same shaft.

The cam 28 has a high portion 28ª extending through substantially 180° and is adapted, when rotated to the position shown in Fig. 2, to force together a pair of resilient contacts 29 and 30, connected by wires 31 and 32 to the binding posts 23 and 25, respectively, and controlling the circuit of motor 6 through wires 69 and 70.

Bearing upon the contact disk 33 are three brushes 34, 35 and 36. The contact disk has a cut away portion 33ª extending through substantially 90° of its periphery, and the brushes are so located that the brush 35 is constantly in engagement with the disk 33, while the brushes 34 and 36 become disengaged therefrom when they drop into the cut away portion 33ª, as shown.

The control circuits are connected to the relay A by means of three binding posts shown at the lower edge thereof, and for convenience in wiring, it is customary to designate these binding posts as red, white and blue, respectively, and to distinguish them by the reference characters R, W and B. It will be helpful to retain this terminology. Thus in Fig. 1, the brush 34 is connected by wire 37 to the binding post R, the brush 35 through wire 38 to the binding post W, and the brush 36 through wire 39 to the binding post B. Wires 43 and 44, commonly red and blue respectively, connect the binding posts R and B with the respective contacts of the thermostat 21.

The third wire 46, connected with the bi-metallic element 45 of the thermostat, extends, in existing systems, to the binding post W, and is usually referred to as the white wire. In my improved apparatus, however, this wire 46, instead of being connected to the binding post W, extends to a special contact 47 associated with my improved switching means, which will now be described.

As diagrammatically illustrated in Fig. 1, I employ a pair of switch members designated 49 and 53. The switch member 49 is supported by a resilient strip or spring 50 from a fixed support 51, and this support is connected by a wire 52 with the binding post W of the relay A.

The other switch member 53 is supported by a resilient strip or spring 54 from a fixed member 48, which also serves as a contact adapted to be engaged by the switch member 49.

The switch member 53 plays between two additional contacts 55 and 56, which are connected by wires 57 and 58, respectively, with one side of the solenoids 17 and 18, the other sides of which are connected by wires 59 and 60 with the binding posts R and B respectively of the relay.

The switch members 49 and 53 are independently movable and are shown as being provided with rigid arms 61 and 62, formed either of insulating material or else insulated from the switch members, such arms being in closely adjacent superposed relation, as best shown in Fig. 8.

63 designates a standard form of time clock having a twenty-four hour dial, and driven by a synchronous motor or other suitable mechanism. For convenience, the face of this dial is usually divided into light and dark areas, corresponding roughly to the day and night hours.

In order to actuate the switch members 49 and 53, I mount upon the dial 63 a special cam device 64, best shown in Figs. 7 and 8. This comprises an upstanding flange and a base pivotally mounted by means of a screw 65 on a U-shaped bracket 66, adapted to be slipped over and embrace the edge of the dial 63, and be secured thereto by means of a set screw 67 adapted to enter a groove 68 with which such dials are usually provided.

The cam member 64 is capable of angular adjustment about its pivot 65, and as shown, is adapted to be clamped in adjusted position, by the head of the screw 67 engaging the edge thereof. Thus not only may the clip or bracket 66 be set at any desired point on the dial 63, but the cam 64 itself may be angularly adjusted with respect to the clip or bracket. As clearly shown in the drawings, the curved surface of the cam 64 is adapted to engage and wipe past the ends of the arms 61 and 62, and thus actuate the switch members 49 and 53, and the angular position of the cam determines the length of time that it remains in engagement with the arms 61 and 62.

Having thus described the general organization of my improved apparatus, its operation will now be briefly explained.

The clip 66 carrying the cam 64 is attached to the edge of the clock dial 63 in a position corresponding to the hour at which it is desired the banking of the furnace to take place. By way of illustration, the cam is shown in Fig. 1 as set upon the night section of the dial at approximately the ten o'clock position.

The dial turns in the direction of the arrow and as the cam 64 moves upwardly, it will eventually engage the ends of both switch arms 61 and 62 and shift both switches over into the position shown in Fig. 1. It may be explained at this point that normally, when the cam 64 is not in engagement with the switch arms, the switches are in the position shown in full lines in Fig. 3, in which the switch 49 engages the contact 47, thus, in the arrangement shown in Fig. 1, connecting the "white" wire 46 with the binding post W of the relay, the same as it would be connected in systems where my invention is not used.

As illustrated in Fig. 1, the circuit of the motor 6 is open at the contacts 29 and 30, this condition resulting from the fact that at the last actuation of the thermostat, the disk 33 had been moved into the position shown, the radial edge 33$^b$ of the notch of the disk having just passed out from under the brush 34 and opened the circuit at that point, thus stopping the motor 27 with the parts in the position shown.

The shifting of the switches 49 and 53 by the cam 64 over into the position shown in Fig. 1, results in interrupting the circuit to the thermostat and establishing two connections, namely, the switch 49 is moved into engagement with the contact 48 and the switch 53 is moved into engagement with the contact 55. This establishes a circuit as follows, beginning with one side of the secondary of the transformer 26, current flows over the wire 42, wire 39, brush 36, disk 33, brush 35, wires 38 and 52, switch member 49, contact 48, switch member 53, contact 55, wire 57, solenoid 17 and wires 59 and 41 through the windings of motor 27 and wire 40 back to the transformer. This causes the motor 27 to revolve and rotate the cam 28 and disk 33 in the direction indicated by the arrow. This rotation will continue until the disk 33 reaches the position shown in Fig. 2 in which the radial edge 33$^b$ of the notch passes out from under the brush 36, thus interrupting the circuit and stopping the motor 27.

The circuit just traced through contact 55 and wire 57 energizes the solenoid 17 and causes it to shift the damper 9 to open position, as shown in Figs. 1 and 6. Although the circuit through this solenoid is broken after a few seconds, by the disk 33 moving to the position shown in Fig. 2, the damper remains in this open position until positively closed by the solenoid 18.

When the disk 33 and cam 28 came to rest, as a result of the brush 36 slipping off of the disk 33, as shown in Fig. 2, the cam 28 stopped with the high part 28$^a$ thereof engaging the contacts 29 and 30 and closing them, as shown in Fig. 2. Current then flows from the binding post 22 to the binding post 24 and thence over the wire 69 through the motor 6 and back through the wire 70 to binding post 25, thence through wire 32, contacts 30 and 29, and wire 31, back to line at binding post 23.

Thus the motor 6 is put into operation and continues to run so long as the cam 28 remains in the position shown in Fig. 2.

It will be remembered, however, that the same operation which initiated the closing of the motor circuit also opened the damper 9, so that while the motor continues to run, this damper remains open. The motor drives the screw conveyor 4 and continuously delivers fuel into the fire box, but, by virtue of the fact that the damper 9 is open, the blower is rendered ineffective to supply air to the fire. Consequently, "banking" takes place and continues as long as the motor circuit is closed.

The length of time that the motor circuit remains closed, and the damper 9 open, is determined by the angular setting of the cam 64. It can be set to remain in engagement with the switch arms for any desired length of time, within certain limits. As for example, it may be set at such an angle that it will maintain the switches in the position shown in Fig. 1 for twenty minutes, or for ten minutes, or for such other time as has been determined to be desirable.

It will be noted by reference to Figs. 1 and 7 that the switch arms 61 and 62 are not directly superposed but that one is offset with respect to the other, so that the arm 62 slips off of the end of the cam a short time before arm 61.

Fig. 2 shows the condition of the system at the moment when arm 62 has slipped off of the end of the cam, while arm 61 is still in engagement therewith. Under these conditions, switch member 49 still engages contact 48, but switch member 53 has moved back, under the influence of spring 54, into engagement with contact 56. In this position, a circuit can be traced as follows, namely, beginning with the transformer 26, current flows through wire 40, motor 27, wire 41, wire 37, brush 34, disk 33, brush 35, wires 38 and 52, switch arm 49, contact 48, switch arm 53, contact 56, wire 58, solenoid 18, wire 60 and wire 42 back to the transformer.

The immediate effect of current flowing through this circuit is that the solenoid 18 is energized and instantly closes the damper 9, as shown in Fig. 2. At the same time, the motor 27 is energized and rotates the cam member 28 and disk 33, as before. In a few seconds, the high part of the cam 28 passes out from under the contacts 29 and 30, and these contacts open, thus stopping the motor 6 and slightly later still the disk 33 reaches the position shown in Fig. 1, and breaks the circuit of pilot motor 27 at brush 34. Thus the banking operation has been completed.

After a small interval, depending upon the amount that the switch arms 61 and 62 are offset with respect to each other, and which interval may be made as small as desired, the switch arm 61 also slips off the edge of the cam 64, and the spring 50 returns the switch member 49 into engagement with contact 47, as shown in full lines in Fig. 3. This completes the connection between the binding post W of the relay and the bi-metallic strip 45 of the thermostat, and thus restores control of the system to the thermostat. The thermostat will thenceforth function in a normal way, the same as it would if my improvements were not used.

From the foregoing, it will therefore be seen that once during the twenty-four hours, and at any particular hour desired, the time clock transfers the control of the system from the thermostat to itself. At the same time, it puts the motor 6 into operation and simultaneously opens the damper 9. The banking operation then takes place as described, and at the end of a predetermined interval, the time clock closes the damper, stops the motor 6, and restores the control to the thermostat.

In many existing installations, the clock or timing device, having the twenty-four hour dial 63, is used for the purpose of shifting the control from the "day" to the "night" thermostat and vice versa. For the sake of simplicity, this well known "day" and "night" thermostat arrangement and shifting means has been omitted from the drawings. The usual practice is, however, to provide a switch for shifting from one thermostat to the other, and to mount upon the dial 63, at any point desired, a clip similar to the clip 66, illustrated in Fig. 8, and arranged to actuate said switch at a predetermined hour. Inasmuch as the desired time for the banking operation may in many cases coincide with the desired hour for shifting from one thermostat to the other, my improved switch actuating cam 64 may, in such cases, be mounted upon or combined with the standard clip or lug which normally operates the thermostat switch, instead of being mounted upon the special clip 66 shown in the drawings. In fact, if existing standard equipment be redesigned to embody switch elements corresponding to my novel switch members 49 and 53, such switch elements might well be combined with the usual thermostat changeover switch, so that all of the switches would be operated by a single slip or lug on the clock dial. An advantage, however, of constructing my improved switch members 49 and 53 as separate and independent of the thermostat change-over switch is that it makes it possible to apply my improvements as an attachment to existing systems.

In Fig. 3, I have shown how an improved thermo-electric relay which I have devised can be employed in a system of this character, in place of the commercially available relay A shown in Figs. 1 and 2.

This improved thermo-electric relay comprises a pair of bi-metallic strips 71 and 72, mounted in any suitable way at one end to a fixed support. The other end of each of the strips is bent inwardly toward the other strip, so that the free ends are substantially in alignment.

Positioned between the two strips 71 and 72 and generally parallel therewith is a spring strip 73 anchored by a screw 74 to a fixed support 75 and constituting a snap switch.

Referring to Figs. 9 and 10, I have attempted to illustrate this strip in more detail. The strip is made of springy material, such as bronze, and at a suitable point intermediate its ends I make a screw hole $73^b$, and deform or upset the material immediately surrounding this hole as by hammering or pressing so as to form a kind of bulge or cup $73^a$. In other words, the material is spread out in this area, and thus, confined by the surrounding material, is placed under strain. When the bulged or strained portion of the strip is clamped tightly against a fixed support, such as 75, by means of a screw 74, as shown in Fig. 3, it develops the peculiar property of snapping suddenly from side to side when moved laterally. Furthermore, instead of being like a pivoted lever, in which opposite ends move in opposite directions, the opposite ends of my improved resilient strip move in the same direction. Thus, when the lower end is pushed toward the right, the upper end snaps over to the right, and vice versa. In Fig. 3, I have shown the movement and bending or bowing of this strip as somewhat exaggerated for the sake of clearness. The ends of the bi-metallic strips 71 and 72 are adapted to engage the strip 73 at a point below the support 75, and to push the strip one way or the other, at this point. As above explained, this has the effect of causing the upper end to snap over in the same direction in which the lower end is pushed.

In order to incorporate this improved thermal relay into a stoker control system of the character shown in Figs. 1 and 2, I connect it as illustrated in Fig. 3. The upper end of the strip or switch 73 is adapted to engage contacts 76 and 78, connected respectively with the ends of windings 77 and 79, which encircle the respective bi-metallic strips 71 and 72. The opposite ends of the windings 77 and 79 are connected to binding posts R and B, corresponding to the similarly lettered binding posts of Figs. 1 and 2, and which are connected by wires 43 and 44 to the opposite contact points of the usual thermostat 45. The bi-metallic strip of the thermostat 45 is connected, as in Fig. 1, by wire 46, with the contact 47.

The strip 73 is itself connected, as by means of the screw 74, through wire 72 with one side of the secondary of the transformer 26, while the other side of this transformer is connected by wire 52 with the fixed support 51.

The circuit of motor 6 is controlled by a special contact 30 carried by but insulated from the lower end of the spring strip 73. This contact is adapted to engage a fixed contact 29, which is connected by wire 31 directly with one side of the supply circuit, at binding post 23. The other side of the supply circuit is connected through binding posts 22 and 24 and wire 69 to the motor 6, whence the return path is through wire 70, binding post 25 and wire 32 to contact 30.

The return circuit wires 59 and 60 from the solenoids 17 and 18 are connected as before to the binding posts R and B.

The apparatus is shown in full lines in Fig. 3 in the position which the parts occupy during the normal control of the system by the thermostat 45, the circuit from the transformer being connected with the thermostat 45 through wire 52, switch 49, contact 47 and wire 46. The snap switch 73 is shown in full lines in the position to which it has been moved by the last operation of the thermostat 45, namely, an operation which moved the snap switch 73 to a position in which it opened the circuit of motor 6.

Should the building become too cool and the thermostat 45, answering the demand for more heat, move over into engagement with the left hand contact, a circuit will be established from one side of the transformer through wire 42 to the snap switch 73, thence to contact 76, through the winding 77, wire 43, thermostat 45, wire 46, contact 47, switch 49 and wire 52, back to the transformer. Current flowing through this circuit will cause the winding 77 to heat the bi-metallic strip 71 and its free end will therefore move inwardly until it finally engages and pushes over the lower end of the snap switch 73. When this lower end has been moved over a certain distance, the strip will snap into dotted line position, thus closing and holding closed the motor circuit at 29, and at the same time breaking contact at 76 and closing it at 78. The breaking of the contact at 76 stops the current flow through the actuating or heating coil 77, which caused the operation, and at the same time prepares a circuit through the other heating coil 79, ready for the next operation. The motor circuit being closed at 29, the motor 6 will operate to feed coal to the furnace and at the same time supply air thereto until the desired heat has been produced. When the temperature rises to the desired point, the thermostat 45 engages the right hand contact, thus closing the circuit through the heating coil 79, and causing the bi-metallic strip 72 to push the snap switch 73 back into full line position again, thus opening the motor circuit and allowing the stoker to be idle.

My improved auxiliary switch members 49 and 53 operate the motor switch through the heating windings 77 and 79 in the same way as just described except that the current, in flowing to these windings, must pass through one of the solenoids 17 or 18 in series.

In Fig. 3, I have illustrated in dotted lines the position of the cam 64 and the switch members 49 and 53 at the time when the banking operation is taking place. When the switch members were shifted to dotted line position, current flowed down through the switch member 53, contact 55 and wire 57 to and through solenoid 17, wire 59, winding 77, contact 76, snap switch 73 and wire 42 back to the transformer. This not only caused the bi-metallic strip 71 to kick over the switch 73 and thus close the motor circuit, as above described, but at the same time it energized solenoid 17 and thus moved the damper 9 to open position, as indicated in dotted lines. Hence, with the motor 6 running and delivering coal to the furnace while the damper 9 is open, thus rendering the air supplying means ineffective, the banking operation takes place as previously described. At the end of the banking period, when the switch 53 returns to engagement with the contact 56, the solenoid 18 is energized, closing the damper 9, and at the same time the current passes through the winding 79, thus causing the thermal relay to kick the motor switch open.

It will thus be seen that the special thermo-electric relay will perform all of the functions, both with the normal thermostat control, and with my special timing device control, that the commercially available relay shown in Figs. 1 and 2 performs, and the mechanism is obviously much simpler and cheaper.

While, in the preceding figures I have illustrated double pole thermostatic systems in which one operation is required to start the motor and another operation to stop it, the broad principle underlying my improved banking control is also applicable to systems employing only a single pole thermostat.

The essentials of such a system are illustrated in Fig. 4, and for the sake of simplicity, no transformer is shown. A thermostatic element 45 is adapted to engage a single contact 81, and this is connected by wire 82 to one side of the motor 6, the other side being connected by wire 69' and 59 directly with the line at binding post 23. Also only a single cam operated switch member 53 is necessary. This normally engages a back contact 56', connected by wire 46' with the thermostatic element 45. When actuated by the cam 64, the switch 53 engages simultaneously two contacts 55 and 55', the latter being connected by wire 70' with the wire 82 leading to the motor, and the other being connected by wire 57 to one side of the solenoid 17, the other side of which is connected to line by wire 59. It will be noted that but a single solenoid is employed, and instead of the solenoid 18 previously described, I employ a spring 80 to close the damper 9 when the solenoid 17 is de-energized.

The operation of this simplified system will be obvious. Under normal conditions, with the switch member 53 in the position shown, the thermostat 45 opens and closes the motor circuit in the usual manner, in accordance with the heat requirements. When the cam 64 engages the switch arm 62, and shifts the switch 53 over into engagement with the contacts 55 and 55', control is thus taken from the thermostat and at the same time current flows through wire 83 both through wire 70' to the motor and also through wire 57 to the solenoid 17, the latter resulting in opening the damper 9 and in holding it open so long as the solenoid 17 is energized. This solenoid remains energized, as will be obvious, during the time that the cam 64 is in engagement with the switch arm 62. At the end of the banking operation, when this switch arm slips off of the cam 64, the motor circuit is opened at contact 55' and the feeding of coal stopped, and at the same time the circuit of solenoid 17 is opened at contact 55 and the spring 80 closes the damper 9. Thus the system is restored to the normal control of the thermostat.

While I have shown and described in the preceding figures a time clock or similar device for initiating the banking operation at a predetermined hour, I also contemplate, as falling within the broad concept of my invention, initiating the banking operation manually.

Such an arrangement is diagrammatically illustrated in Fig. 5. In this figure, the same reference characters have been used so far as possible and it is believed unnecessary to trace the circuits in detail as they are substantially the same as in Fig. 4.

Instead of the time clock 63 or similar device, I employ a manually operated time controlled circuit closing arrangement, comprising a switch arm 84 pivoted at one end and having a knob by which it may be manually turned in the direction of the arrow. This switch arm carries a pawl 88 engaging a ratchet 89, the movement of the arm 84 being opposed by a helical spring 90. The ratchet wheel 89 carries gear teeth 91 engaging a pinion 92 connected with another gear 93, which in turn drives any suitable retarding means such as an escapment 94.

The arm 84 is adapted to engage a pair of arcuate conducting strips 85 and 86, the first being connected by wire 57 with the solenoid 17, and the second by wire 87 to the motor 6.

The arm 84 is shown as directly connected by wire 83 to one side of the line, and as normally resting against the back stop 56', the same as in Fig. 4.

When the arm is turned toward the right, the spring 90 is partially wound, and when the arm is released, this spring slowly moves the arm back to its initial position, the speed of such movement being controlled by the escapment or other timing mechanism. The length of time that the arm 84 remains in contact with the arcuate strips 85 and 86 depends upon the angular distance through which it is moved. Thus, by way of example, it may be moved through such a distance as to require ten or twenty or thirty minutes to return to normal position. Thus the banking period may be controlled as desired.

When the arm 84 engages the arcuate strips 85 and 86, the motor is put into operation, and the solenoid 17 energized as described in connection with Fig. 4.

While, for the sake of simplicity, I have shown the operating knob attached directly to the switch arm 84, it will of course be understood that in practice the mechanism of the device will be enclosed in a suitable casing and an operating handle mounted on the outside thereof, together with a dial showing the various time intervals.

It will thus be seen that while in the arrangement shown in Fig. 5 the banking operation is manually initiated by moving the arm 84 around, it is automatically controlled by means of the timing device, and that after a predetermined time interval, the banking operation will be stopped and the control of the system restored to the thermostat.

While in Figs. 4 and 5 I have shown the control circuits as connected directly to the power lines, it will, of course, be understood that in practice a transformer, such as shown in Figs. 1 and 2, will preferably be employed, this transformer supplying current to the control circuits which, through suitable relays, will operate the actual motor circuit.

In all of the various modifications of the invention herein described, it will be seen that I have provided a timing device for controlling the banking operation, whether initiated manually or automatically, that during the banking period the air supplying means is rendered ineffective while the fuel supplying means operates, and that at the end of a predetermined interval, the banking operation is stopped and the control restored to the thermostat.

While I have illustrated, by way of example, a release damper for controlling the air supply, it will of course be understood that I contemplate the use of any one of a number of other possible means for rendering the air supplying means ineffective. Thus, I may employ an entirely different type of damper, or, instead of a damper, I may provide a remote controlled clutch device between the motor and the blower, so that the latter may be disconnected during the banking operation.

Also, while I have shown electromagnetic means for operating the air control, it will be understood that any other suitable means, such, for example, as fluid pressure means, may be employed instead, if desired.

No claim is made herein to the special snap switch construction and thermal relay arrangement, above described, claims to this subject-matter being presented in a continuing application Serial No. 536,167, filed May 18, 1944.

What I claim is:

1. The combination with an automatic stoker having power driven fuel feeding means and a blower, of remote control means for putting the fuel feeding means into operation and simultaneously rendering the blower ineffective, said means also including automatic time controlled means in addition to the stoker for stopping the fuel feeding means after a predetermined interval and restoring the blower to a condition in which it is effective to supply air to the fire whenever said power driven means operates.

2. The combination with an automatic stoker having fuel feeding means and a blower, of a thermostat for normally wholly controlling the operation of said stoker, a timing device, means for transferring entire control of said stoker from said thermostat to said timing device and then putting the fuel feeding means into operation and simultaneously rendering the blower ineffective to supply air to the fire, and means actuated by said timing device for stopping the fuel feeding means and rendering the blower again effective to supply air to the fire whenever said fuel feeding means operates, and for restoring normal control to said thermostat.

3. The combination with an automatic stoker having fuel feeding means and a blower, of a thermostat for normally wholly controlling the operation of said stoker, a timing device, means for transferring entire control of said stoker from said thermostat to said timing device, means actuated by said timing device for restoring the control to said thermostat after a predetermined interval, and means serving, during at least a portion of the period when the control is vested in said timing device, to maintain said fuel feeding means in continuous operation, while rendering the blower ineffective.

4. The combination with an automatic stoker having power driven fuel feeding means, a blower, and means for controlling said fuel feeding means, a conduit extending from said blower, of a damper associated with said conduit, and which, when in normal position, allows the effective delivery of air from said blower through said conduit to the fire, automatic time controlled means for shifting said damper to a position in which it prevents the effective delivery of air through said conduit while said fuel feeding means is operating, and means for automatically restoring said damper to normal position after a predetermined interval.

5. The combination with an automatic stoker comprising a motor, fuel and air supplying means driven by said motor, a circuit for said motor, a thermostat normally wholly controlling said circuit, means independent of said motor for governing said air supplying means, and switching means which, when operated, serves to deprive said thermostat of its normal control and to actuate said governing means to render the air supplying means ineffective and simultaneously close said motor circuit.

6. The combination with an automatic stoker having power driven fuel feeding means and a blower for the fire, of a thermostat for normally wholly controlling the operation of said stoker, a timing device, means independent of said thermostat for putting the fuel feeding means into operation and for simultaneously rendering the blower ineffective to supply air to the fire, and means controlled by said timing device for stopping the fuel feeding means and simultaneously restoring the blower to a condition in which it is effective to supply air to the fire whenever the power driven means is in operation.

7. The combination with an automatic stoker having fuel feeding means and a blower, and means for simultaneously driving the same, of a timing device associated therewith, means controlled by said timing device for first putting the fuel feeding means into operation and simultaneously rendering the blower ineffective, and then, after a predetermined interval, stopping the fuel feeding means and simultaneously restoring the blower to a condition such that air will be supplied to the fire whenever said driving means operates.

8. The combination with an automatic stoker having fuel feeding means and a blower, of a thermostat for normally wholly controlling the operation of said stoker, a clock device, means operated by said clock device at a definite hour for transferring entire control of said stoker from said thermostat to itself for a predetermined time interval and then restoring normal control to said thermostat, and automatic means serving, during at least a portion of said time interval, to maintain said fuel feeding means in continuous operation while rendering said blower ineffective to supply air to the fire.

9. The combination with a mechanical stoker having power driven fuel feeding and air supplying means, of a timing device, means including said timing device for putting the fuel feeding means into operation and simultaneously rendering the air supplying means ineffective, means controlled wholly by said timing device for maintaining the fuel feeding means in continuous operation during a predetermined interval and then stopping the same, and means operating simultaneously with the stopping of said fuel feeding means for restoring said air supplying means to a condition in which it is effective to supply air to the fire whenever said stoker is in operation.

10. The combination with an automatic stoker comprising a motor, fuel and air supplying means operated by said motor, a relay for starting and stopping said motor, a circuit for controlling said relay, and electromagnetic means in said circuit in series with said relay winding, which, when energized, renders said air supplying means ineffective while the motor is operating.

11. The combination with an automatic stoker comprising a motor, fuel and air supplying means driven by said motor, a relay for starting and stopping said motor, a thermostat normally controlling said relay, governing means for rendering said air supplying means ineffective while the motor is running, a clock device, and means brought into operation by said clock device at a predetermined hour for depriving said thermostat of its normal control and for then actuating simultaneously said governing means and relay.

12. The combination with a mechanical stoker having power driven fuel feeding and air supplying means, of a relay for starting and stopping the stoker, a thermostat normally controlling said relay, a timing device, switching means operated by said timing device for shifting the control of said relay from said thermostat to itself for a predetermined period and then restoring control to said thermostat, and means whereby, upon such shifting of control, the fuel feeding means is started and maintained in continuous operation for at least a portion of said period, while the air supplying means is rendered ineffective.

ROBERT J. McFALL.